United States Patent
Murray et al.

(10) Patent No.: US 6,807,587 B1
(45) Date of Patent: Oct. 19, 2004

(54) METHODS AND APPARATUSES FOR GUARANTEED COHERENCY OF BUFFERED DIRECT-MEMORY-ACCESS DATA

(75) Inventors: James Murray, Mountain View, CA (US); Jean-Didier Allegrucci, Sunnyvale, CA (US)

(73) Assignee: Xilinx Inc., San Jose, CA (US)

( * ) Notice: Subject to any disclaimer, the term of this patent is extended or adjusted under 35 U.S.C. 154(b) by 498 days.

(21) Appl. No.: 09/695,112

(22) Filed: Oct. 23, 2000

Related U.S. Application Data

(63) Continuation-in-part of application No. 09/664,605, filed on Sep. 18, 2000.

(51) Int. Cl.[7] .............................................. G06F 13/28
(52) U.S. Cl. ............................. 710/22; 710/33; 710/35; 710/30; 711/152; 711/154
(58) Field of Search ............................ 710/22, 35, 33, 710/30; 711/154, 152

(56) References Cited

U.S. PATENT DOCUMENTS

| | | | |
|---|---|---|---|
| 5,915,104 A | * 6/1999 | Miller | 710/310 |
| 6,311,234 B1 | * 10/2001 | Seshan et al. | 710/22 |
| 6,336,154 B1 | * 1/2002 | McCarthy et al. | 710/35 |
| 6,370,625 B1 | * 4/2002 | Carmean et al. | 711/152 |
| 6,438,628 B1 | * 8/2002 | Messerly et al. | 710/35 |
| 6,496,905 B1 | * 12/2002 | Yoshioka et al. | 711/154 |

* cited by examiner

Primary Examiner—Jeffrey Gaffin
Assistant Examiner—Niketa Patel
(74) Attorney, Agent, or Firm—Blakely, Sokoloff Taylor & Zafman

(57) ABSTRACT

A method for ensuring data coherency in buffered direct memory access (DMA) data transfers. The DMA controller realizes the last piece of data is being transferred to the write buffer. The DMA controller then sends a "Last Write Data" signal to the external memory access arbitration unit. The external memory access arbitration unit then allows completion of all pending memory operations. If a memory request occurs, a wait line is asserted such that memory operations (i.e., reading from, or writing to, the memory) are prevented for all sources other than the DMA channel associated with the "Last Write Data" signal. The external memory access arbitration unit also grants priority to the DMA channel associated with the "Last Write Data" signal. This effectively flushes the write buffer and completes the buffered DMA data transfer. The external memory access arbitration unit then deasserts any asserted wait lines and memory operations are no longer prevented.

18 Claims, 2 Drawing Sheets

METHODS AND APPARATUSES FOR GUARANTEED COHERENCY OF BUFFERED DIRECT-MEMORY-ACCESS DATA

CROSS-REFERENCE TO RELATED APPLICATION

This application is a Continuation-in-Part of U.S. patent application Ser. No. 09/664,605, filed Sep. 18, 2000, entitled "METHODS AND APPARATUSES FOR GUARANTEED COHERENCY OF BUFFERED DIRECT-MEMORY-ACCESS DATA."

FIELD OF THE INVENTION

The present invention relates generally to direct memory access (DMA) data transfers, and more specifically to coherent and efficient transfers of buffered DMA data.

BACKGROUND

Direct memory access (DMA) is a method of transferring data without the intervention of the microprocessor. This allows for memory to be accessed without a negative impact on system performance. DMA data transfers are used for data transfers between input/output (IO) devices and memory and also for memory-to-memory data transfers. DMA data transfers, when not buffered, suffer from the limitation that only one piece of data is transferred at a time. When a system has an external memory that is wider than the source or destination of the data being transferred, the memory subsystem is not used to full capacity in transferring data. For example, if the external memory is 32 bits wide and the source or destination of the transferred data is only 8 bits wide then only 8 bits can be transferred at a time. This method does not make full use of the memory subsystem that could handle a 32 bit wide transfer. Further, non-buffered DMA data transfers cannot always take advantage of the burst mode read or write, a capability of dynamic random access memory (DRAM) which maximizes memory bandwidth.

Buffering the DMA data resolves the problem of maximizing the capabilities of the memory subsystem and maximizing memory bandwidth by taking advantage of the burst mode capability of DRAM, but not without a considerable drawback. Buffered DMA data suffers from a lack of coherency. Coherency in this sense means that data intended to be written to a memory location will be correctly read from that location at a future time. When DMA data is buffered during transfer, the coherency of the data may be jeopardized as follows. When the DMA data is being transferred from, for example, an IO device, but has not yet been written out to the desired memory location, portions of the data are stored in a write buffer. If there is an attempt to read during this time, the data may not be correct. That is, while data for some memory locations is temporarily held in the write buffer, an attempted read operation to those locations will return data previously written to those locations.

This lack of data coherency in buffered DMA data transfers is dealt with in several ways. A simple method is to prevent any read from taking place while there is data stored in the write buffer. This method is used in a cached microprocessor system using a write-through strategy and a write buffer. If a read is attempted the write buffer is flushed first and then the read is allowed to take place. This method has a considerable impact on system performance. If no read can occur while the write buffer contains any data, the detrimental impact on system performance is nearly equivalent to a non-buffered DMA data transfer system.

A more sophisticated method of dealing with the effect on data coherency in buffered DMA data transfers is to include circuitry to keep track of which memory address locations the data in the write buffer will be written to. The addresses are then compared with the addresses of the current read operation. If a match occurs between the addresses, then the corresponding data for that address which is in the write buffer will be returned in response to the read operation. If a match does not occur, then the data stored in the memory address will be returned in response to the read operation. The drawback of this method is that the process of matching the read addresses with the addresses in the write buffer requires extra registers to hold the address ranges and circuitry capable of rapidly comparing addresses. The design is similar to a cache in complexity and increases the area requirements significantly.

Another method of avoiding the data coherency problem is to manage the DMA data transfers with software control. The DMA unit (DMAU) communicates with the microprocessor system in order to establish the end of a DMA data transfer. One such communication mechanism is the use of interrupts. The software must make sure that the data is not read while the DMA is active and must also make sure that the data is safe to be read after the write buffer is empty. This method relies on the DMAU having repeated contact with the microprocessor, and, to some degree, defeats the purpose of DMA data transfers (i.e. direct access) and adversely affects system performance.

Locking the DMA channel is another method of ensuring the coherency of DMA transfer data through the interaction of the system components. The DMAU communicates with the memory sub-system. The DMAU monitors the write buffer and will not initiate another DMA data transfer until all the data in the write buffer has been written to memory. In this situation the DMA will not specifically inform the CPU, or other bus master, that the transfer is complete until the memory subsystem lets the CPU know that the buffer has been flushed. The memory subsystem indicates the buffer has been flushed with a dedicated signal. This scheme does not tax the microprocessor to the extent the software control method described above. Nevertheless, there is a major drawback. There are dedicated signals between the DMAU and the memory subsystem that allow the DMA channel to be locked while data is being written out from the write buffer to memory. This requires each DMAU to work exclusively with a particular memory subsystem, severely limiting the flexibility of the system. Thus, the DMAU is a less generic implementation.

SUMMARY OF THE INVENTION

A method is described for transferring data to memory. A last write data indicator is included in the data as the last piece of data to be transferred. The data is transferred to a write buffer and the last write data indicator is received by the write buffer. If a memory request occurs, a wait line is asserted such that memory operations (i.e., reading from, or writing to, the memory) are prevented for all sources other than the DMA channel associated with the "Last Write Data" signal. All data within the write buffer is transferred to the memory after the last write data indicator is received by the write buffer. This data transfer method maintains the coherency of the transferred data with minimal impact on system performance.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

An embodiment of the present invention provides a more efficient method of effecting a buffered direct memory access transfer of data. The memory subsystem prevents memory operations only when the write buffer contains the last of the data to be transferred. This is accomplished by including in the write data a last write data indicator. When this indicator is received by the memory subsystem, the external memory access arbitration unit will prevent memory operations from any other source and grant priority to the DMA channel associated with the last write indicator. This priority means the data in the write buffer will be transferred to memory immediately, thereby preventing a loss of coherency. This DMA data transfer is accomplished without taxing system performance.

An intended advantage of one embodiment of the invention is to provide buffering for DMA data transfers with guaranteed data coherency. Another intended advantage of one embodiment of the invention is to provide buffering for DMA data transfers with minimal additional circuit area. Another intended advantage of one embodiment of the invention is a last write data indicator that is a two-bit signal. Another intended advantage of one embodiment of the invention is to provide efficient I/O to memory DMA data transfers. Another intended advantage of one embodiment of the invention is to provide efficient memory-to-memory DMA data transfers. Another intended advantage of one embodiment of the invention is to provide efficient DMA data transfers to dynamic random access memory. Another intended advantage of one embodiment of the invention is to transfer data in burst mode.

Figure 1:
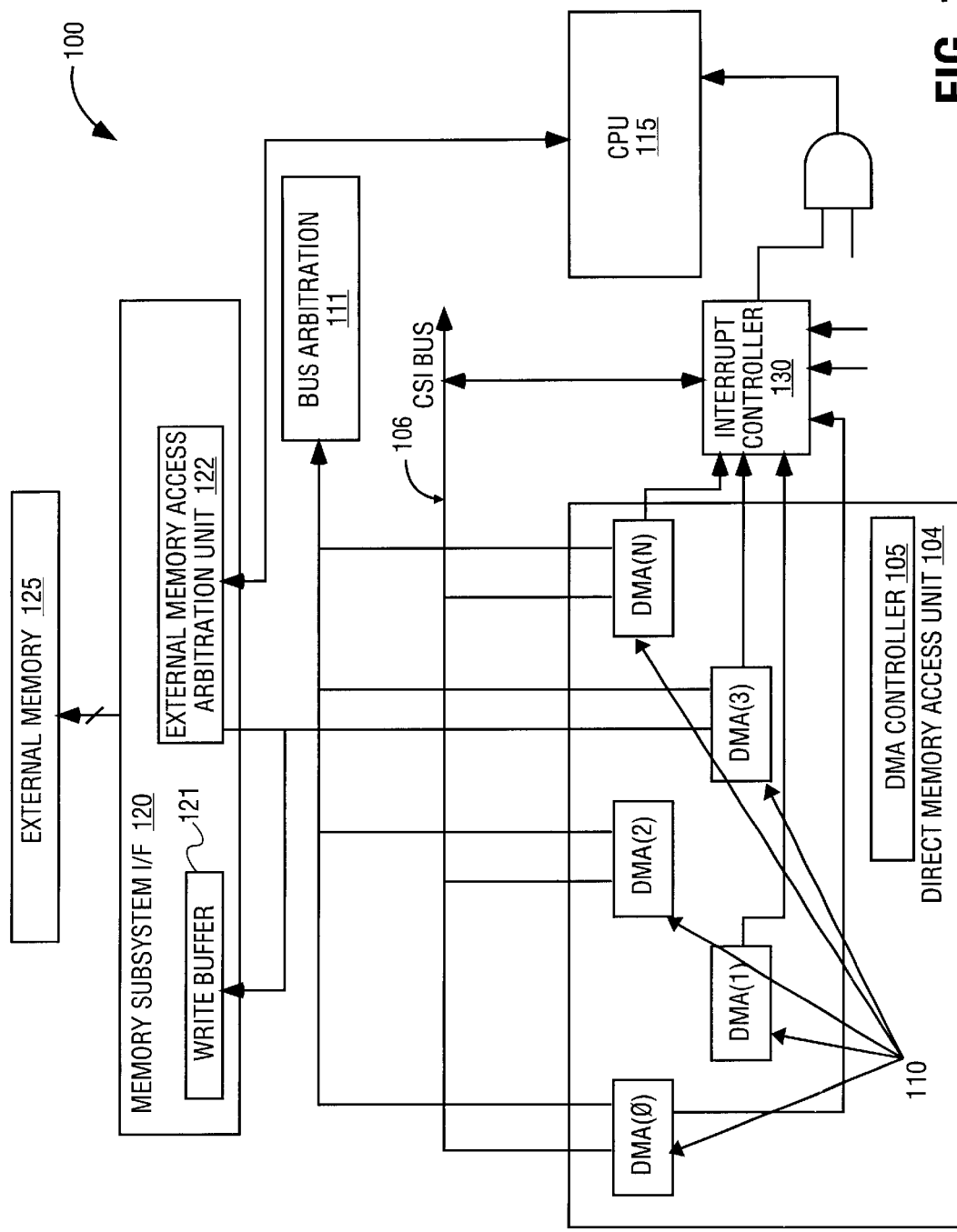
FIG. 1 is a block diagram of a configurable processor system.

FIG. 1 depicts those portions of a configurable processor system relevant to an embodiment of the present invention, although a variety of different computing systems can implement the present invention. The system 100 shown in FIG. 1 includes a direct memory access unit (DMAU) 104 composed of a DMA controller 105 and a plurality of independent DMA channels (DMA$_0$, DMA$_1$, DMA$_2$, DMA$_3$, and DMA$_{(n)}$) 110. The DMA channels 110 are connected through the configurable system interconnect bus 106 to the memory subsystem interface 120. The DMA channels are also connected to the system bus arbitration 116. Contained in the memory subsystem interface 120 are the write buffer 121 and the external memory access arbitration unit 122. The memory subsystem interface 120 is connected to external memory 125. The external memory 125 could be SRAM, DRAM, synchronous DRAM, or other types of memory.

Figure 2:
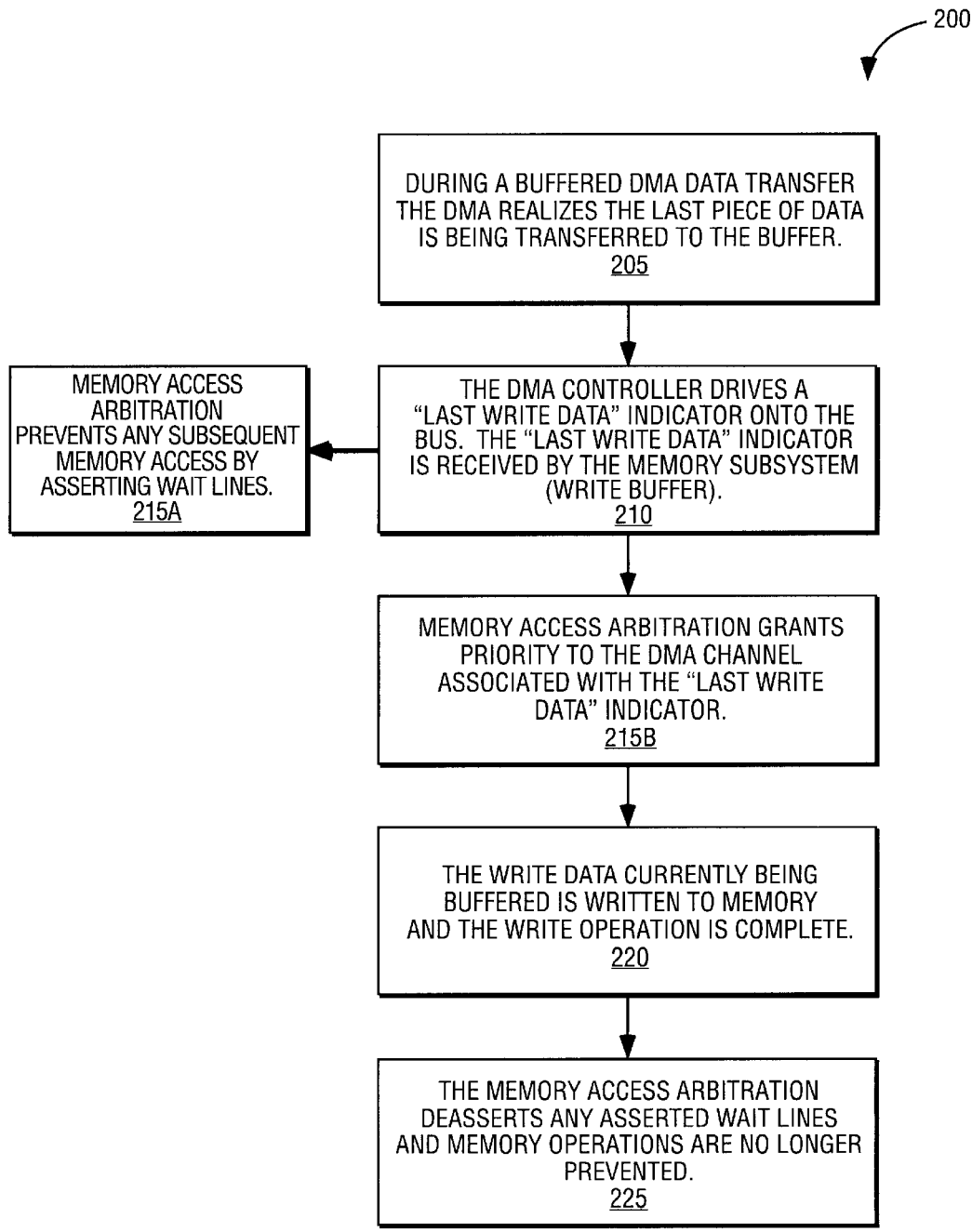
FIG. 2 is flow chart of the buffered direct memory access data transfer process of the present invention.

FIG. 2 describes the process by which a buffered DMA data transfer is accomplished in accordance with one embodiment of the present invention. The process 200 shown in FIG. 2 begins at operations 205 in which a buffered DMA data transfer operation is underway from one of the DMA channels 110, for example DMA$_0$. The software for the data transfer operation is configured so that there will be no memory operations at the addresses that are being written to while the DMA channel, DMA$_0$ is transferring data.

During the data transfer, the DMA controller 105 realizes that the last piece of data is being transferred to the write buffer 121. A signal is sent from the DMA channel, DMA$_0$, to the interrupt controller 130.

The interrupt controller 130 then interrupts the CPU, which uses the interrupt controller register to determine where the interrupt came from. At this point the CPU 115 would view the transfer as complete and again allow read operations to the addresses that were being written to. The result would be a lack of coherency as described above (i.e., a memory operation would retrieve erroneous data.) This is prevented by operation 210 in which the DMA controller 105 drives a "Last Write Data" signal onto the CSI bus. The "Last Write Data" signal is received by the memory subsystem 120. This causes the external memory access arbitration unit 122 to conduct two operations. In operation 215a the external memory access arbitration unit 122 prevents any subsequent memory operations from taking place. This is done by asserting a wait line on the CSI bus 106 for any source requesting a memory operation. The memory operation request could come from another DMA channel 110, the CPU 115, or any bus master (e.g., a Joint Test Action Group (JTAG) unit, not shown). For one embodiment, the wait is asserted only when a memory operation request occurs. In operation 215b, the external memory access arbitration unit 122 grants priority to the DMA channel, DMA$_0$, associated with the "Last Write Data" signal. In operation 220, the grant of priority allows all the data currently being held in the write buffer 121 to be written to memory 125, thereby completing the write operation. The external memory access arbitration unit 122 then deasserts any wait lines asserted in operation 215a and memory operations are no longer prevented, shown as operation 225.

In the foregoing specification, the invention has been described with reference to specific exemplary,embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for transferring data to memory, comprising:
    determining that a last piece of data is being transferred to the buffer during a buffered direct memory access data transfer;
    including with the data, subsequent to the last piece of data being transferred, a last write data indicator, the last write data indicator associated with one of a plurality of direct memory access channels;
    transferring the data to a write buffer;
    asserting a wait line when the last write data indicator has been transferred to the write buffer, if a memory operation request occurs, such that the memory operation is prevented, for all sources other than the direct memory access channel associated with the last write data indicator;
    granting priority to the direct memory access channel associated with the last write data indicator; and
    transferring all data in the write buffer to the memory when the last write data indicator has been transferred to the write buffer.

2. The method of claim 1, wherein the last write data indicator is a two-bit signal.

3. The method of claim 1, further comprising:

deasserting the wait line after all the data in the write buffer has been transferred to memory such that the memory operation is no longer prevented.

4. The method of claim 1, wherein transferring the data to a write buffer further includes periodically transferring data within the write buffer to memory and transferring more data to the write buffer.

5. The method of claim 4, wherein periodically transferring data is accomplished through a memory access arbitration scheme.

6. The method of claim 5, wherein the memory comprises dynamic random access memory.

7. The method of claim 6, wherein the transferring is done in burst mode.

8. The method of claim 1, wherein data is transferred from an input/output device to memory.

9. The method of claim 1, wherein data is transferred from one memory location to another memory location.

10. An apparatus for transferring data to memory, comprising:

a controller configured to transfer the data to a write buffer, such that subsequent to a last piece of data transferred, a last write data indicator is transferred, the last write indicator associated with one of a plurality of direct memory access channels; and an external memory access arbitration unit configured to assert a wait line when the last write data indicator has been transferred to the write buffer, if a memory operation request occurs, such that the memory operation is prevented, for all sources other than the direct memory access channel associated with the last write data indicator, and grant priority to the direct memory access channel associated with the last write data indicator to effect the transfer of all data within the write buffer to the memory when the last write data indicator has been received by the write buffer.

11. The apparatus of claim 10, wherein the external memory access arbitration unit is further configured to deassert the wait line after all the data within the write buffer has been transferred to memory such that the memory operation is no longer prevented.

12. The apparatus of claim 10, wherein the controller is further configured to periodically transfer data within the write buffer to memory and transfer more data to the write buffer.

13. The apparatus of claim 12, wherein periodically transferring data is accomplished through a memory access arbitration scheme.

14. The apparatus of claim 12, wherein the memory comprises dynamic random access memory.

15. The apparatus of claim 12, wherein the transferring is done in burst mode.

16. The apparatus of claim 10, wherein data is transferred from an input/output device to memory.

17. The apparatus of claim 10, wherein data is transferred from one memory location to another memory location.

18. The apparatus of claim 10, wherein the apparatus is part of a configurable system on a chip.

* * * * *